Nov. 1, 1949 — G. C. PEARCE — 2,486,873
DOMESTIC APPLIANCE
Filed Jan. 5, 1945 — 5 Sheets-Sheet 1

INVENTOR.
George C. Pearce
BY Spencer Hardman Hyler
Attorneys

Nov. 1, 1949 G. C. PEARCE 2,486,873
DOMESTIC APPLIANCE
Filed Jan. 5, 1945 5 Sheets-Sheet 2

INVENTOR.
George C. Pearce
BY
Spencer Hardman & Foley
Attorneys

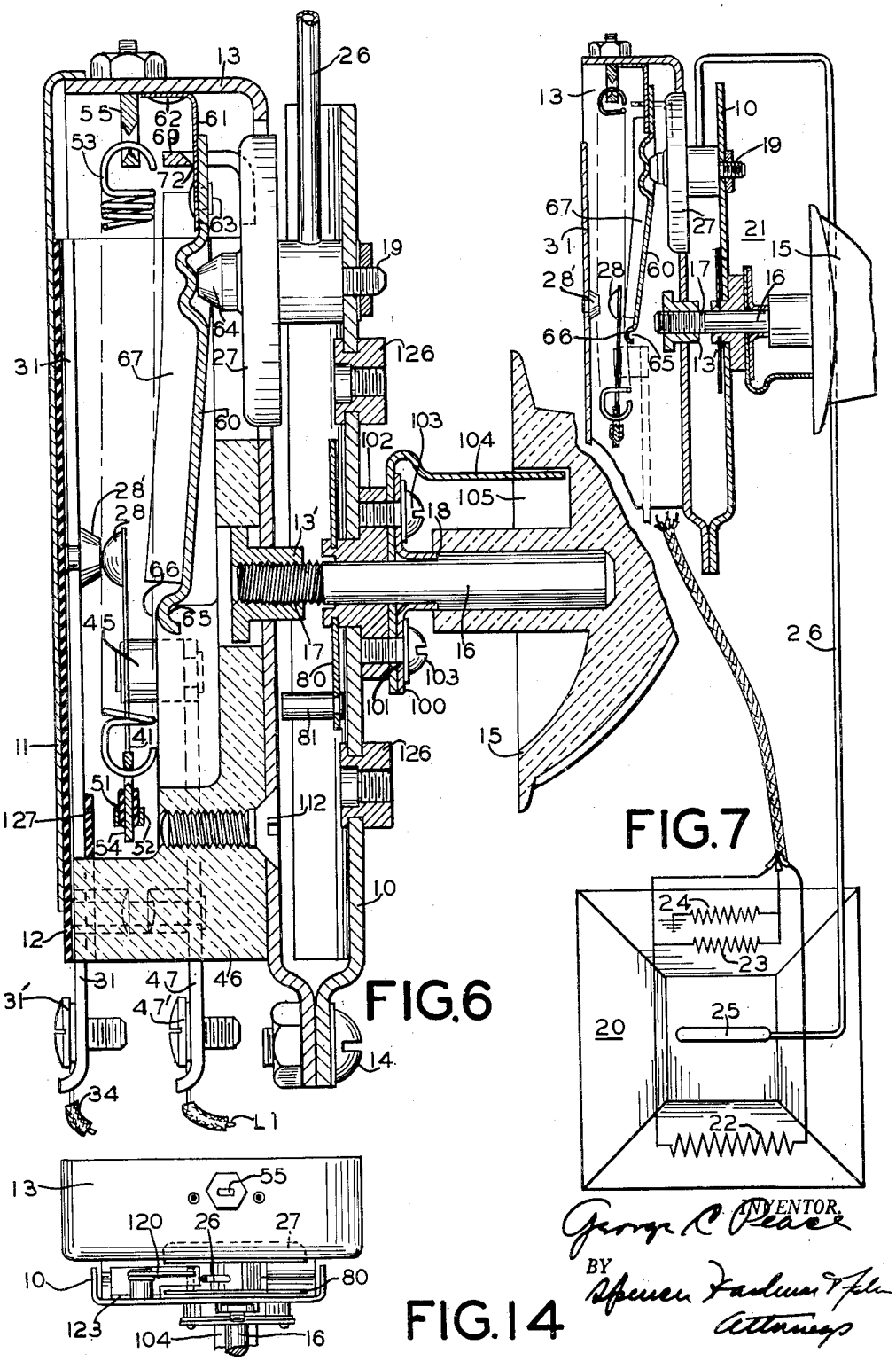

Nov. 1, 1949   G. C. PEARCE   2,486,873
DOMESTIC APPLIANCE
Filed Jan. 5, 1945   5 Sheets-Sheet 5
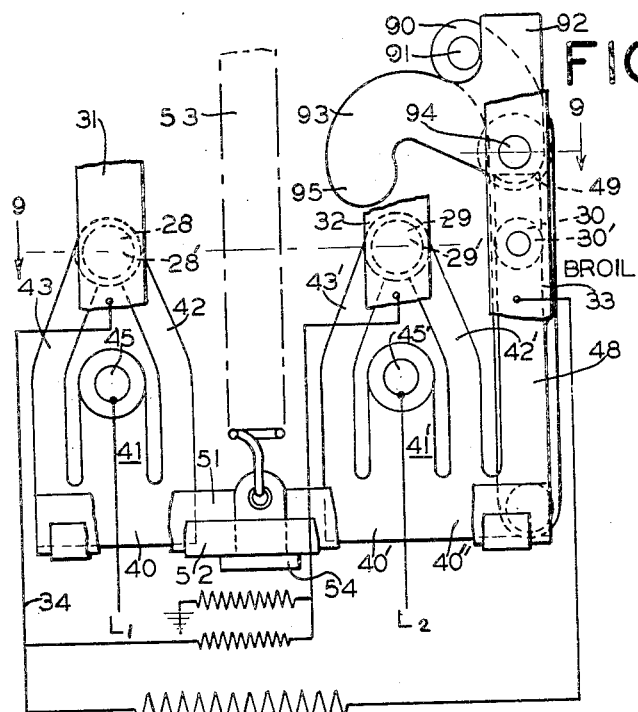
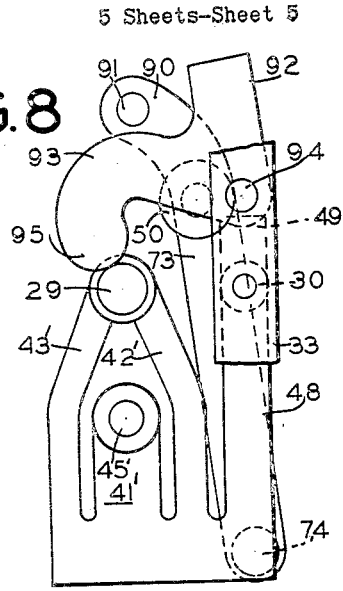
FIG.8
FIG.12 PREHEAT
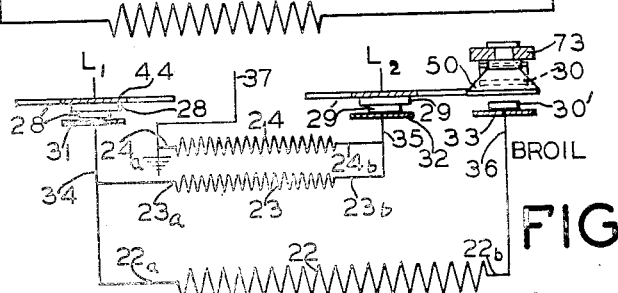
FIG.9
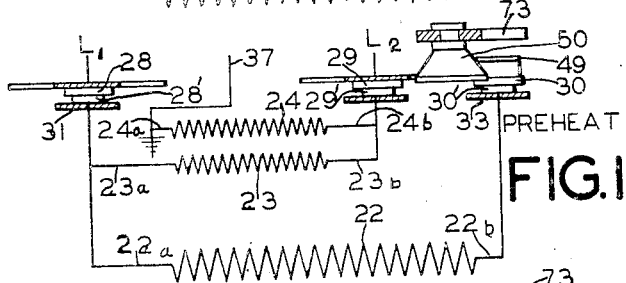
FIG.10
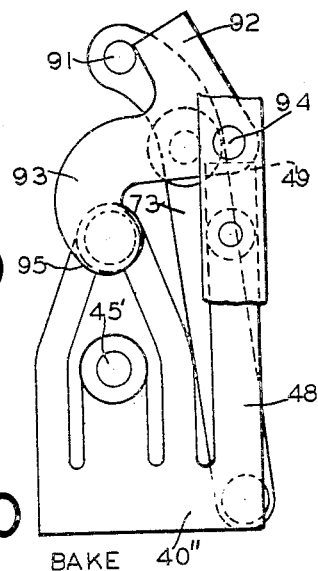
FIG.13 BAKE
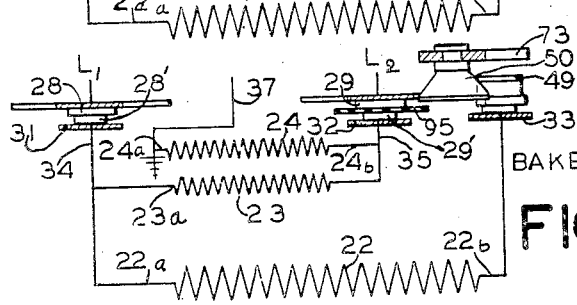
FIG.11
INVENTOR.
George C. Pearce
BY Spencer Hardman &c.
Attorneys Patented Nov. 1, 1949

2,486,873

UNITED STATES PATENT OFFICE 2,486,873

DOMESTIC APPLIANCE

George C. Pearce, Dayton, Ohio, assignor to General Motors Corporation, Dayton, Ohio, a corporation of Delaware Application January 5, 1945, Serial No. 571,404

6 Claims. (Cl. 219—20)

This invention relates to domestic appliances and more particularly to electric ranges or the like.

An object of this invention is to provide an oven of a domestic range or the like with a simplified thermostatic control.

Another object of this invention is to provide an oven thermostatic control in which the upper and lower heaters of the oven are controlled by three pairs of thermostatically actuated contacts in such a manner that both oven heaters may be turned on at full capacity for preheat, the upper alone at full capacity for broil, the lower heater at full capacity and upper heater at reduced output for bake, and all heaters positively turned off when no energization is desired.

Another object of this invention is to provide an oven thermostatic control in which the power lines may be connected to the make and break mechanism without the necessity of providing flexing wires.

Further objects and advantages of the present invention will be apparent from the following description reference being had to the accompanying drawings, wherein a preferred form is clearly shown.

In the drawings:

Fig. 6 is a cross-section taken along the line 6—6 of Figs. 1, 3 and 5;

Fig. 7 is a diagrammatic cross-section, on reduced scale, showing the thermostatic control connected to the oven, in the off position;

Fig. 8 is an elevation of a portion of Fig. 5, diagrammatically connected to the oven circuit in the broil position;

Fig. 9 is a diagrammatic cross-section taken along the line 9—9 of Fig. 8 also showing the circuit in broil position;

Fig. 10 is a view similar to Fig. 9 but showing the circuit in preheat position;

Fig. 11 is a view similar to Fig. 9 but showing the circuit in bake position;

Fig. 12 is a view, somewhat similar to a portion of Fig. 8, showing the parts in preheat position;

Fig. 13 is a view similar to Fig. 12 showing the parts in bake position; and

Fig. 14 is a top view of the thermostatic control as shown in Fig. 7.

Figures 1, 2:
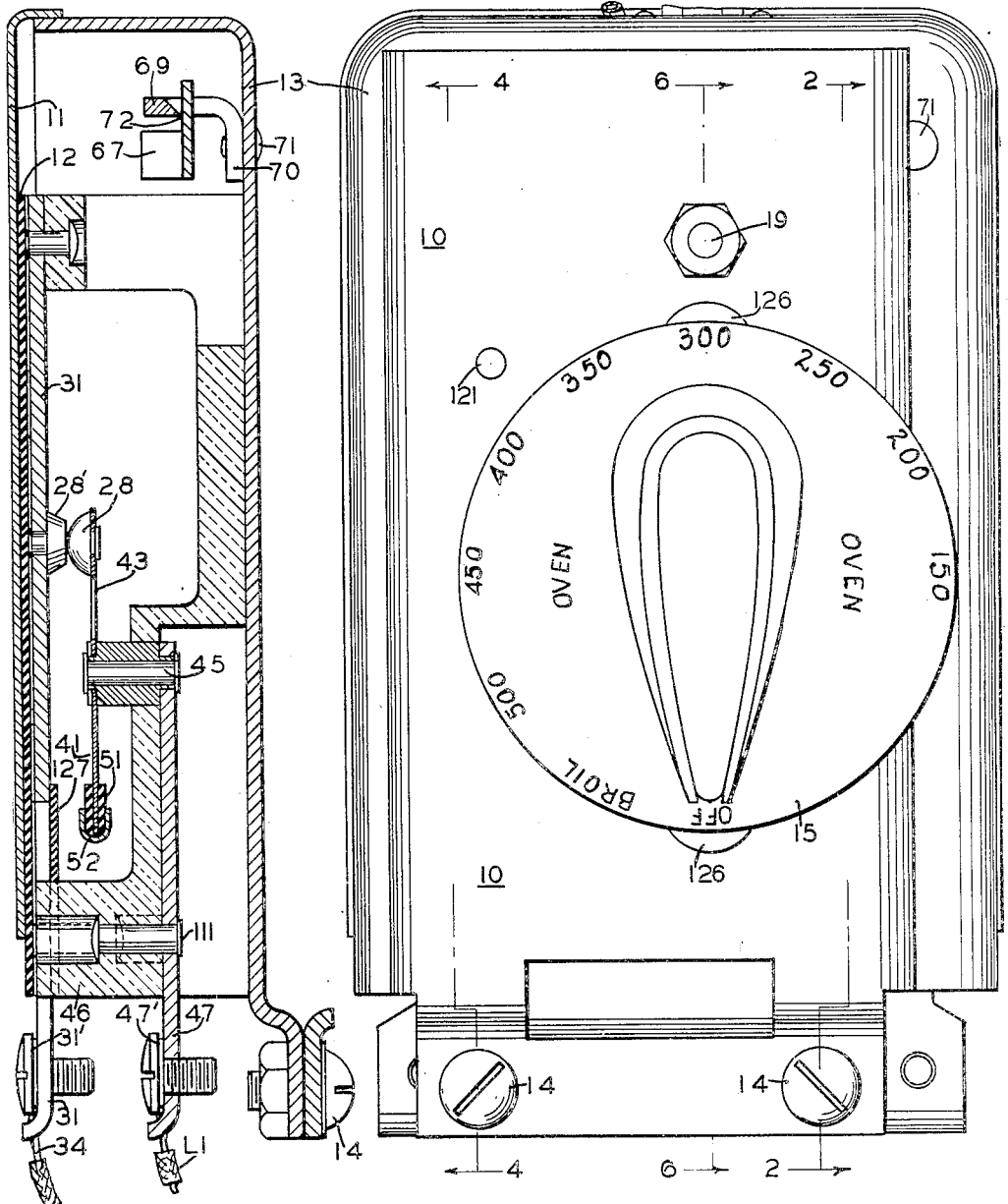
Fig. 1 is a front elevation of the thermostatic control.
Fig. 2 is a cross-section taken along the line 2—2 of Figs. 1, 3 and 5.

My invention includes an oven 20 (Fig. 7) and a thermostatic control 21 for the oven. The oven 20 is provided with a lower heater 22 and with an upper heater consisting of sections 23 and 24, the sections 23 and 24 being uniformly distributed over the top of the oven. The heater 22 is evenly distributed over the bottom of the oven, and, if desired may have a baffle over it, not shown, such as disclosed at 60 in the patent to F. H. McCormick 2,314,592. The upper and lower heaters may have the general construction shown in said McCormick patent, it being understood that the upper heater has its wires in two sections as diagrammatically illustrated in this application.

The thermostatic control 21 includes a bulb 25 placed in the oven, and connected by a tube 26 to the expansible diaphragm 27. The diaphragm 27 opens and closes the switch contacts 28, 29 and 30, (Figs. 5–13) in response to temperature conditions as more fully hereinafter described.

The thermostatic control 21 has a movable plate 10 (Figs. 1, 6, 14) hinged to a metal casing or box 13 by means of the bolts 14. The casing 13 and plate 10 have a spring tension tending to spread them away from each other at 14. The casing 13 and plate 10 thus form, in effect, first and second relatively movable plates. The knob 15 is mounted on shaft 16, which has a left-handed threaded engagement at 17 with bushing 13' fixed in casing 13 and an axial thrust (to the left in Fig. 6) at 18 against the face of plate 10. Thus this threaded engagement provides a rotary cam axial thrust means to move the plate 10 and box 13 to and from each other. Turning of the knob 15 fulcrums the plate 10 about the bolts 14. When the shaft 16 is threaded into casing 13, by a counterclockwise turning of knob 15, an axial thrust results at 18 which swings the plate 10 toward casing 13 against its inherent spring action. When the shaft 16 is unthreaded at 17, by the turning of knob 15 clockwise, the shaft 16 releases some of its thrust at 18 and allows the plate 10 to swing away from casing 13, the fulcrum being at 14.

The plate 10 carries the diaphragm 27 by the bolt and nut construction 19. Therefore when there is a relative movement between plate 10 and casing 13, there is also a relative movement between diaphragm 27 and casing 13. This changes the setting of the diaphragm 27 with respect to the movable contacts 28, 29 and 30, (Figs. 5–11) which are carried by the casing 13 and causes the contacts to snap between open and closed positions at different temperatures, depending on the rotative position of knob 15. Rotation of the knob 15 therefore sets the temperature at which the contacts open and close to correspond with the temperature at the top of the knob. When the knob is turned to the "off" position (Fig. 1), the plate 10 and diaphragm 27 are moved so far to the left (Fig. 7) that the diaphragm cannot collapse sufficiently to close the contacts regardless of the temperature in the oven.

The diaphragm 27 opens and closes the movable contacts 28, 29 and 30 in response to oven temperatures by mechanism more fully to be described. As the diaphragm expands in response to rise in oven temperature the contacts 28, 29 and 30 open substantially at the temperature indicated by the knob 15 thus turning off the heaters in the oven. As the temperature in the oven falls slightly, the diaphragm contracts sufficiently to close the contacts 28, 29 and 30 thus re-energizing the heaters to heat the oven. The oven is therefore maintained substantially at the temperature selected by the turning of knob 15.

The movable switch contacts 28, 29 and 30 (Figs. 5, 9–11) are paired with stationary switch contacts 28', 29' and 30' carried by bars 31, 32 and 33 respectively. These bars are connected to the lines 34, 35 and 36 respectively leading to the heaters, the connection being made through the usual line eyelets and screw-threaded connectors 31', 32' and 33' respectively. Contacts 28, 29 and 30, which are permanently connected to lines $L_1$ and $L_2$, are operated in a manner to energize the bars 31, 32 and 33, lines 34, 35 and 36 and heaters 22, 23 and 24 as more fully to be described.

The line 34 is connected to one terminal 23a of the section 23 and one terminal 22a of heater 22. The line 35 is connected to one terminal 24b of heater 24 and to terminal 23b of heater 23. The line 36 is connected to terminal 22b of heater 22. The terminal 24a of heater 24 is connected to the grounded line 37.

The section 23 is of such resistance that its maximum capacity for glowing red heat is obtained when it is connected between the live lines $L_1$ and $L_2$, which provide the maximum voltage. The section 24 is of such resistance that it produces its glowing red heat when connected between $L_2$ and the grounded or neutral line 37. The heater 22 is of such resistance that it produces its glowing red heat when connected between $L_1$ and $L_2$.

To produce broiling conditions in the upper heater, section 23 is connected between $L_1$ and $L_2$ and section 24 is connected between grounded line 37 and $L_2$ as shown in Fig. 9. Both sections 23 and 24 glow red under broil conditions. For preheat conditions, sections 23 and 24 are connected as in broil, and heater 22 is connected between $L_1$ and $L_2$, the preheat connection being shown in Fig. 10. All three sections 22, 23 and 24 glow red under preheat conditions. For baking, sections 23 and 24 are connected in series between $L_1$ and grounded line 37 to operate at a materially reduced wattage, while heater 22 is connected between $L_1$ and $L_2$. The bake circuit is illustrated in Fig. 11. Heater 22 glows red and sections 23 and 24 are black hot under bake conditions. When operating in the broil and preheat positions, section 23 may have a capacity of 2000 watts, while section 24 may have a capacity of 1000 watts. When operating in the bake position sections 23 and 24 may have a combined capacity of 235 watts. Heater 22 may have a capacity of 2000 watts. These figures are given by way of illustration for use in the ordinary domestic oven, such as illustrated in the said McCormick patent.

The foregoing brief description shows that the oven heaters are controlled by three pairs of thermostatically opened and closed contacts 28—28', 29—29' and 30—30'. These contacts are the only ones required to obtain the necessary energization of the oven heaters.

Figure 5:
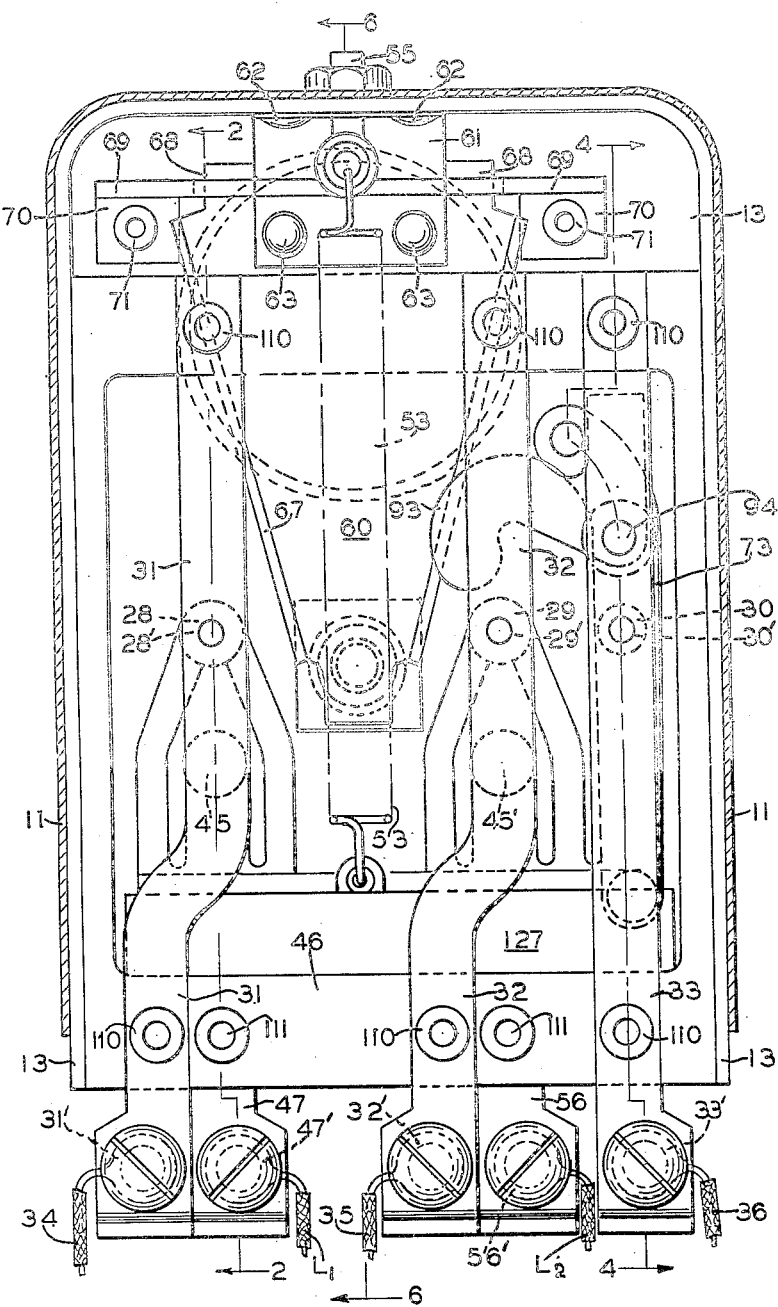
Fig. 5 is a rear elevation of the thermostatic control with the rear cover 11 and the rear insulating sheet 12 removed.

The power lines $L_1$ and $L_2$ are permanently connected to the movable contacts 28, 29 and 30 by a novel construction. The line $L_1$ is connected to power connector bar 47 by the line eyelet and screw construction 47' (Figs. 2, 5). The bar 47 is in turn connected to a sheet metal conductor which produces a snap opening and closing movement of contact 28. This sheet metal conductor includes a bridge portion 40 (Fig. 8), an inner leg portion 41 (to which the bar 47 is connected permanently) and two outer leg portions 42 and 43 which are carried by the bridge portion 40 and are joined at 44 (Fig. 9) to carry the movable contact 28. Current can therefore flow from the line $L_1$ through 47, 41, 40, 42 and 43 to the contact 28. The upper portion of the central inner leg 41 is anchored to a stationary insulating frame 46 by a rivet construction 45 (Fig. 2) passing through a portion of the frame 46 and which is connected to the input bar 47.

The line $L_2$ is connected to power connector bar 56 by the line eyelet and screw construction 56' (Fig. 5). The bar 56 in turn is connected through rivet 45' to a sheet metal conductor somewhat similar to the one just described; but which has an extension 40'' (Fig. 8), so that it energizes both of the contacts 29 and 30. The line $L_2$ is connected, through bar 56, to the inner central leg 41', which in turn is connected to the bridge 40' and the two outer leg portions 42' and 43' which are joined to carry the movable contact 29. The sheet metal conductor 40', 41', 42' and 43' is substantially the same in construction and operation as the conductor 40, 41, 42 and 43. In addition, the bridge 40' has an extension 40'' to a fourth leg 48 which carries the movable contact 30 and then bends slightly backward (see Fig. 4), so that its end 49 may be engaged by the cam 50 to hold the contact 30 away from the contact 30' during the broil position. The fourth leg 48 tends to snap in the same direction as the legs 42' and 43', except when held open by the cam 50.

Figure 4:
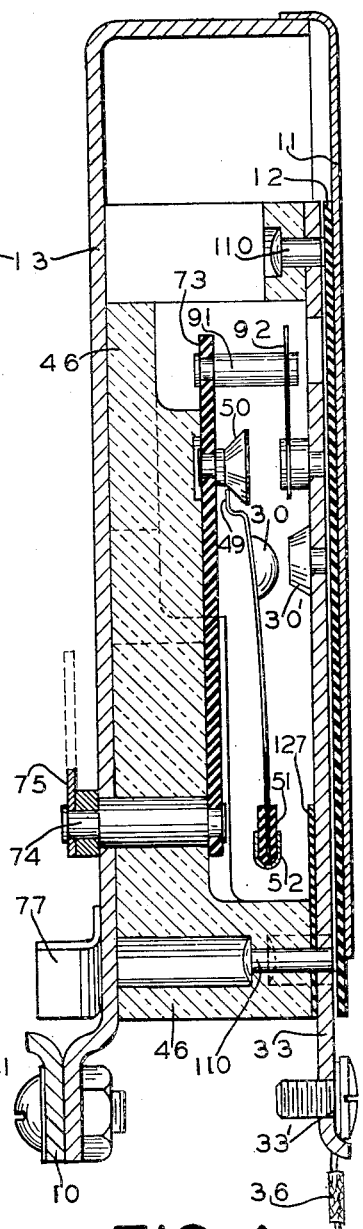
Fig. 4 is a cross-section taken along the line 4—4 of Figs. 1, 3 and 5.

The bridges 40 and 40' are embedded in an insulating bar 51 which is supported on a metal outer bridge bar 52, so that the bridges 40 and 40' operate in unison with the bars 51 and 52 (Figs. 4, 6, 8). A tension spring 53 is connected to the metal bar 52 by T-shaped member 54, the spring 53 extending to a bolt 55 at the top of the casing 13. The tension spring 53 places the legs 41 and 41' in compression between bridges 40, 40' and rivets 45 and 45', and, as the spring 53 is moved laterally by the thermostat, the contacts 28, 29 and 30 snap in the opposite direction to the lateral movement of the spring 53. The contacts 28, 29 and 30 tend to snap in unison under the impulse of the thermostatic element unless their operation is modified as hereinafter described in the broil and bake positions.

Lateral movement of the spring 53 by the diaphragm 27 is accomplished through the medium of a lever 60 (Fig. 6). The lever 60 is mounted on a leaf spring 61 which is riveted at 62 to the top of casing 13, and is riveted at 63 to the lever 60. The spring 61 biases the lever 60 to the right, in Fig. 6, against the extension 64 of the diaphragm 27. Expansion of the diaphragm 27 swings the lever 60 to the left, Fig. 6, and contraction of the diaphragm 27 permits the lever to be moved to the right, Fig. 6, by the spring 61. The lower end of the lever 60 is formed into a protuberance 65 which can push against the side of the spring 53. The spring 53 is in such alignment between the bolt 55 and the T-shaped member 54 so that it normally swings the leg 41 to the right, in Fig. 6, thus maintaining the contacts 28, 29 and 30 normally closed. However, when the lever 60 is moved to the left, in Fig. 6, the protuberance 65 engages the side of the spring 53 at point 66, and in effect, establishes a subspring between the point 66 and the T-shaped member 54 (see Fig. 7). As the protuberance 65 swings to the left a sufficient distance, the leg 41 is normally biased to the left in Fig. 6, thus opening the contacts 28, 29 and 30 with a snap action. The open position is shown in Fig. 7, while the closed position is shown in Fig. 6.

The lever 60 preferably is a V-shaped channel member (Figs. 5, 6) having marginal flanges 67 extending for a portion of its vertical length. At its upper end, at the corners 68, the lever 60 bears against a fulcrum bar 69 which has ears 70 (Fig. 2) at each end riveted at 71 to the casing 13. The lever 60 thus fulcrums about the points 72 of the fulcrum bar 69, which points 72 are located to engage the corners 68 of the bar 69. Thus sharp fulcrums are provided for the lever 60, which permits sharp calibration of the snapping point.

In the broil position, as shown in Figs. 4 and 9, the movable contact 30 is positively held open away from the stationary contact 30'. This is accomplished by movement of a circular cam 50 carried by a lever 73 (Figs. 4, 8–13), which is fulcrumed on the shaft 74, which extends through the insulating block 46 and casing 13 and is attached to the lever 75 located between the plate 10 and the casing 13. The lever 75 is normally pulled clockwise, in Fig. 3, by a tension spring 76 anchored to the plate 77, which is welded to the casing 13. This normally urges the lever 73 counterclockwise in Figs. 3, 8, 12 and 13, which tends to move the cam 50 away from engagement with the end 49 of the leg 48. However, the knob shaft 16 is connected to a disk 80 (Fig. 3) having a pin 81, which comes into engagement with the lever 75 when the knob 15 is in the broil position shown in Fig. 3. This swings the lever 75 counterclockwise in Fig. 3, thus swinging the lever 73 clockwise in Figs. 5 and 8. This causes the lower edge of the cam 50 to engage the end 49 and swing the leg 48 and contact 30 away from the stationary contact 30'. This opens the contact 30, while the contacts 28 and 29 are closed by the threaded movement of the shaft 16 (Fig. 6) and its consequent action through the diaphragm 27 and lever 60 on the spring 53 and the bridge bars 52, 51 and 40. Thus the circuit shown in Figs. 8 and 9 is established for broiling. In this circuit, the upper heater sections 23 and 24 glow red, at a 2000 and 1000 watt rate respectively, while the heater 22 is deenergized by the open position of the contact 30 away from contact 30'.

The preheat position is attained by first moving the knob 15 clockwise to the broil position (Fig. 1) and then counterclockwise to some selected temperature, such as 300°. While the knob is in the broil position, the lever 73 is in the position shown in Figs. 4 and 8. The lever 73 has a curved extension 90 which carries a pin 91. This pin engages the leg 92 of a mica insulator sheet 93, which is fulcrumed at 94 on bar 33, and moves the end 95 of the insulator 93 from between the contacts 29 and 29' and allows them to close as shown in Figs. 9 and 10. When the knob is turned counterclockwise to the 300° position, from the broil position (Fig. 1), the lever 73 is pulled to the position shown in Figs. 12 and 13 by the action of the spring 76 (Fig. 3) and lever 75 which has been released by the movement of the pin 81 away from the lever 75. The end 95 (Figs. 12, 13) of the mica insulator sheet 93 then rests, by gravity, just above the contacts 29 and 29' in readiness to drop in between them when the contacts 29 and 29' are separated by thermostatic action when the oven reaches a temperature of 300°. Thus the oven is preheated by the circuit shown in Fig. 10 until the oven reaches the 300° temperature. During this time the upper heater sections 23 and 24 and heater 22 glow red at a 2000, 1000 and 2000 watt rate respectively.

In the baking position (Figs. 11, 13), the end 95 of the insulator 93 is between the contacts 29 and 29', thus breaking the connection between $L_2$ and line 35. Current in the upper heater therefore must flow from $L_1$ through 34, 23a, 23, 35, 24 and neutral line 37. These sections then are heated at a black heat, for example by a current of 235 watts. At the same time the lower heater 22 glows red, current passing through it from line $L_1$ to line $L_2$, the current being of 2000 watts. When the lever 73 is in the position shown in Figs. 12 and 13, the cam 50 is moved away from the end 49 of the leg 48 a sufficient distance so that the leg 48 is permitted to close the contact 30 against the contact 30' in the preheat and bake positions, thus energizing the lower heater 22 between $L_1$ and $L_2$.

The knob 15 (Fig. 6) may be calibrated with regard to the shaft 16, in order that the proper temperature may be produced to correspond with the markings on the knob. To this end the disk 100 is welded or otherwise fixed to the shaft 16, and is provided with arc-shaped slots at 101. A hub 102, journaled on plate 10, is loosely mounted on the shaft 16, but can be rigidly secured thereto by tightening the screws 103. Thus, by loosening the screws 103, a relative rotational movement between the disks 100 and 102 can be obtained for calibrating the knob 15. The disk 100 carries an extension finger 104, which extends into the slot 105 in the knob 15, so that the knob 15 can only be placed on the shaft in a position corresponding to finger 104. In this manner calibration of the knob 15 can be obtained.

The hub 102 carries the disk 80, and, when finally calibrated, the disk 80 is rotated whenever the knob 15 is rotated through the action of screws 103 when they are tightened.

Figure 3:
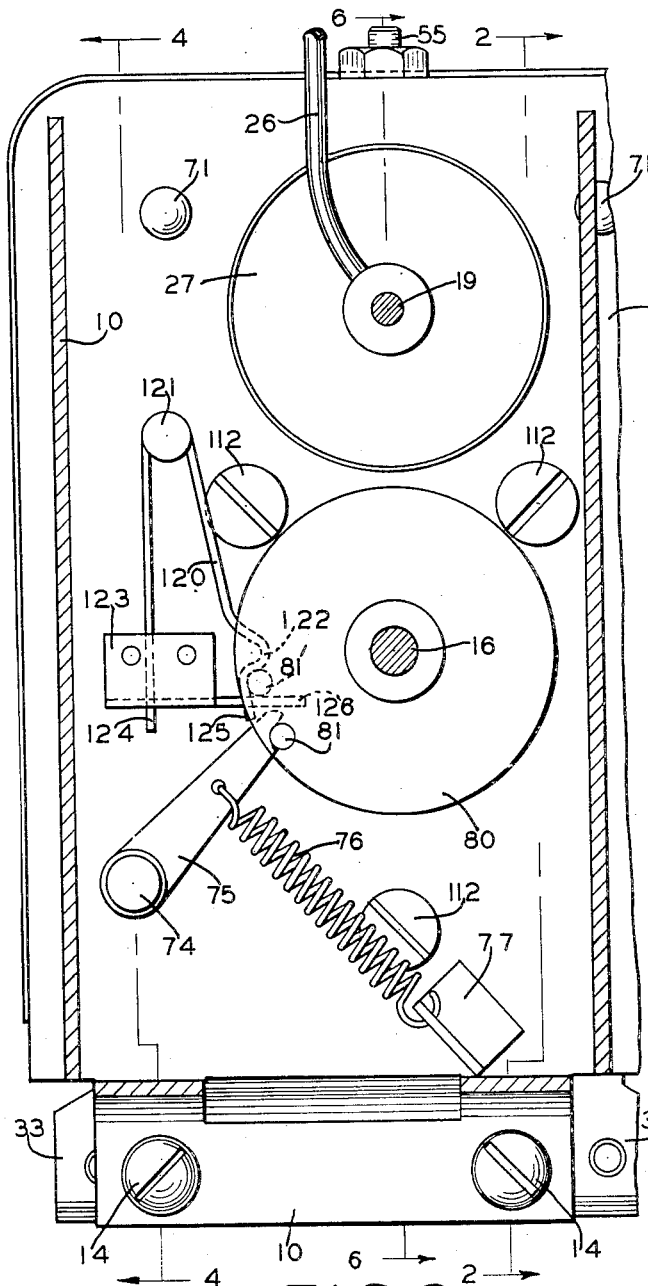
Fig. 3 is a cross-section parallel to Fig. 1 directly behind the plate 10.

There are several miscellaneous structural parts which may be used for convenience as shown in the drawings, but which may be varied, as is evident. Thus the insulating block 46 (Figs. 2, 4, 5, 6) is box-like in its construction. The bars 31, 32 and 33 (Fig. 5) may be riveted against the edge of block 46 by the rivets 110. The bars 47 and 56 are secured to an inner portion of the block 46 by rivets 111 (Figs. 2, 5), 45 and 45'. The block 46 is secured to the casing 13 by screws 112 (Figs. 3, 6). An insulating sheet 12 (Figs. 2, 4, 6) can be placed over the entire face of block 46, and a cover 11 may then be telescoped over the casing 13, and may be secured thereto by any suitable screw construction, not shown. Preferably the plate 10 (Figs. 1, 4, 6, 7, 14) is channel-shaped, and the casing 13 also is channel-shaped, with its upper end closed. An insulating strip 127 (Figs. 4, 5, 6) is held between the block 46 and the bars 31, 32 and 33 to prevent accidental shorting of bars 31, 32 and 33 by the bar 52.

If desired, a spring 120 (Figs. 3, 14) may be wound around the pin 121, which is carried by the plate 10. This spring 120 has a curved portion 122 so shaped that it allows the pin 81 to ride over it as the knob 15 is being turned nearly to the "off" position, the pin 81 reaching the position 81', in Fig. 3, when the knob is in the "off" position. As the pin 81 rides into this position the spring 122 imparts to the operator the sense that the correct "off" position is reached. An L-shaped plate 123 is riveted to the plate 10 and is provided with slots to receive the ends 124 and 125 of the spring 120. The plate 123 also has an extension 126 which forms a positive stop for the pin 81, and prevents the knob 15 from being turned counterclockwise beyond the "off" position or clockwise beyond the broil position.

The thermostatic assembly may be mounted on a panel of the range by means of screws which may be threaded into bushings 126 (Figs. 1, 6).

In the operation of the device, when the knob 15 is in the "off" position, the shaft 16 (Fig. 7) has been threaded into the bushing 13' of casing 13 a sufficient distance so that the diaphragm 27 and extension 64 have swung the lever 60 to the position shown in Fig. 7. This biases the central legs 41 and 41' (Fig. 8) sufficiently to snap them to the left as in Fig. 7, thus opening all three contacts 28, 29 and 30. Regardless of the temperature of the oven, these contacts remain open as long as the knob remains in the "off" position. Should the user desire to perform a broiling operation, the knob 15 is turned clockwise to the broil position (Fig. 1). This unthreads the shaft 16 (Figs. 6, 7) from the bushing 13' a sufficient distance to swing the plate 10 the proper distance away from the casing 13. This allows the lever 60 to swing the proper distance from the spring 53 to maintain all of the contacts 28, 29 and 30 (Figs. 8, 9) in closed position as long as the temperature of the oven remains below about 600°. However, contact 30 is prevented from closing, since at the same time, rotation of the knob 15 has moved the pin 81 into engagement with the lever 75 and has moved it to the position shown in Fig. 3. This in turn, through the shaft 74, swings the lever 73 to the position shown in Figs. 5, 8 and 9. This causes the cam 50 to separate the contacts 30 and 30', and causes the pin 91 to swing the mica insulator sheet 93, so that its point 95 is moved from between the contacts 29 and 29', allowing them to close. The broil circuit shown in Fig. 9 is then established, and the upper heater sections 23 and 24 are energized at their maximum capacity to glow red and produce a broiling action.

Should the user desire to preheat the oven in anticipation of performing a baking operation at 300°, he first moves the knob 15 to broil position (Fig. 1), establishing the circuits just described in the preceding paragraph, and then moves the knob to the 300° position. This latter movement moves the pin 81 (Fig. 3) away from the lever 75 and allows the spring 76 to swing the lever 75, shaft 74 and lever 73 to the position shown in Fig. 12. This causes the cam 50 to be moved away from the leg 48 enough to allow the contacts 30 and 30' to close, and allows the point 95 of the insulator 93 to rest on top of the closed contacts 29 and 29' in readiness to drop in between them when the oven reaches 300°, when the thermostat opens all of the contacts 28, 29 and 30. When the contacts are so opened, the point 95 of insulator 93 drops in between the contacts 29 and 29', so that, when the thermostat again attempts to close the contacts 28, 29 and 30, due to the cooling off of the oven, the contact 29 is prevented from closing on contact 29'. Thereafter the thermostat cycles the heaters on and off with the circuit shown in Fig. 11. Under these conditions sections 23 and 24 are in series between $L_1$ and neutral line 37 to produce a black heat while energized with a 235 watt current while heater 22 is cycled between $L_1$ and $L_2$ to produce a glowing red heat at a wattage of 2000.

While certain wattages have been given, by way of example, and certain structural details have been described with more or less minuteness, it is understood that such details and wattages can be varied within the scope of the claims which follow.

The claims are as follows:

1. In combination: an oven; heaters for said oven; a thermostatic element for said oven; a plurality of pairs of contacts controlling said heaters opened and closed by said element; insulating means normally urged into the space between a pair of said contacts; and means for holding said insulating means from between said pair of contacts to allow said contacts to close while simultaneously holding another pair of contacts open.

2. In combination: an oven; heaters for said oven; a thermostatic element for said oven; a plurality of pairs of contacts controlling said heaters opened and closed by said element; insulating means normally urged into the space between a first named pair of said contacts; and means for holding said insulating means from between said contacts to allow said pair of contacts to close simultaneously with a second named pair of contacts and thereafter to admit said insulating means between said first named pair of contacts when opened by said thermostatic element to maintain said first named pair of contacts open while said second named pair of contacts is opened and closed by said thermostatic element.

3. In combination: an oven; first, second and third heaters for said oven; first, second and third pairs of switch contacts to be opened and closed; a first power line connector connected to one of the contacts of said first pair of switch contacts; a second power line connector connected to one each of the contacts of the second and third pair of switch contacts; said first heater having one terminal connected to a neutral connector and the other terminal connected to the other of the contacts of said second pair of switch contacts; said second heater having one terminal connected to said other of said contacts of said first pair of switch contacts and its other terminal connected to said other of said contacts of said second pair of switch contacts; said third heater having one terminal connected to said other of said first pair of switch contacts and its other terminal connected to the other of said contacts of said third pair of switch contacts; and insulating means movable in between and from between the contacts of said second pair of switch contacts.

4. In combination: an oven; first, second and third heaters for said oven; first, second and third pairs of switch contacts to be opened and closed; a first power line connector connected to one of the contacts of said first pair of switch contacts; a second power line connector connected to one each of the contacts of the second and third pair of switch contacts; said first heater having one terminal connected to a neutral connector and the other terminal connected to the other of the contacts of said second pair of switch contacts; said second heater having one terminal connected to said other of said contacts of said first pair of switch contacts and its other terminal connected to said other of said contacts of said second pair of switch contacts; said third heater having one terminal connected to said other of said first pair of switch contacts and its other terminal connected to the other of said contacts of said third pair of switch contacts; thermostatic means responsive to temperatures in said oven opening and closing said pairs of switch contacts; and insulating means normally urged between said second pairs of contacts and manually movable from between said contacts while said contacts are urged together by said thermostatic means.

5. In combination: an oven; first, second and third heaters for said oven; first, second and third pairs of switch contacts to be opened and closed; a first power line connector connected to one of the contacts of said first pair of switch contacts; a second power line connector connected to one each of the contacts of the second and third pair of switch contacts; said first heater having one terminal connected to a neutral connector and the other terminal connected to the other of the contacts of said second pair of switch contacts; said second heater having one terminal connected to said other of said contacts of said first pair of switch contacts and its other terminal connected to said other of said contacts of said second pair of switch contacts; said third heater having one terminal connected to said other of said first pair of switch contacts and its other terminal connected to the other of said contacts of said third pair of switch contacts; thermostatic means responsive to temperatures in said oven adapted repeatedly to open and close said pairs of switch contacts in response to temperature variations; and manually operable means temporarily to maintain said third pair of contacts open while said first and second pair are repeatedly opened and closed by said thermostatic means.

6. In combination: an oven; first, second and third heaters for said oven; first, second and third pairs of switch contacts to be opened and closed; a first power line connector connected to one of the contacts of said first pair of switch contacts; a second power line connector connected to one each of the contacts of the second and third pair of switch contacts; said first heater having one terminal connected to a neutral connector and the other terminal connected to the other of the contacts of said second pair of switch contacts; said second heater having one terminal connected to said other of said contacts of said first pair of switch contacts and its other terminal connected to said other of said contacts of said second pair of switch contacts; said third heater having one terminal connected to said other of said first pair of switch contacts and its other terminal connected to the other of said contacts of said third pair of switch contacts; thermostatic means responsive to temperatures in said oven opening and closing said pairs of switch contacts; and insulating means normally urged between said second pairs of contacts and manually movable from between said contacts while said contacts are urged together by said thermostatic means; manually operable means temporarily to maintain said third pair of contacts open while said first and second pair are closed by said thermostatic means; and a single knob for adjusting said thermostatic means, moving said insulating means and said manually operable means.

GEORGE C. PEARCE.

REFERENCES CITED

The following references are of record in the file of this patent:

UNITED STATES PATENTS

| Number | Name | Date |
| --- | --- | --- |
| 1,373,128 | Freese | Mar. 29, 1921 |
| 2,067,481 | Findlay | Jan. 12, 1937 |
| 2,078,675 | Lockwood, 2nd | Apr. 27, 1937 |
| 2,085,217 | Hart | June 29, 1937 |
| 2,184,339 | Ettinger | Dec. 26, 1939 |
| 2,197,229 | Waddell | Apr. 16, 1940 |
| 2,197,230 | Waddell | Apr. 16, 1940 |
| 2,224,983 | Parkhurst | Dec. 17, 1940 |
| 2,259,315 | Lockwood et al. | Oct. 14, 1941 |
| 2,363,326 | Hodgins | Nov. 21, 1944 |
| 2,385,434 | Weber | Sept. 25, 1945 |
| 2,388,839 | Fry | Nov. 13, 1945 |

FOREIGN PATENTS

| Number | Country | Date |
| --- | --- | --- |
| 526,906 | Great Britain | Sept. 27, 1940 |